United States Patent
Betting et al.

(10) Patent No.: US 7,242,402 B1
(45) Date of Patent: Jul. 10, 2007

(54) METHOD OF VISUALIZATION OF A PART OF A THREE-DIMENSIONAL IMAGE

(75) Inventors: Fabienne Betting, Paris (FR); Jérôme Francois Knoplioch, Neuilly-sur-Seine (FR); Laurent Launay, Versailles (FR); Yves Trousset, Palaiseau (FR); Régis Vaillant, Villebon sur Yvette (FR)

(73) Assignee: G.E. Medical Systems, S.A. (FR)

( * ) Notice: Subject to any disclaimer, the term of this patent is extended or adjusted under 35 U.S.C. 154(b) by 0 days.

(21) Appl. No.: 09/594,873

(22) Filed: Jun. 15, 2000

(30) Foreign Application Priority Data

Jun. 21, 1999 (FR) .................................. 99 07854

(51) Int. Cl.
*G06T 17/00* (2006.01)
*G09G 5/00* (2006.01)

(52) U.S. Cl. ...................................... 345/424; 345/672

(58) Field of Classification Search ................ 345/419, 345/421, 420, 424, 653, 679, 427; 382/128
See application file for complete search history.

(56) References Cited

U.S. PATENT DOCUMENTS

| | | | | | |
|---|---|---|---|---|---|
| 4,641,255 | A | * | 2/1987 | Hohmann | 345/628 |
| 4,674,046 | A | * | 6/1987 | Ozeki et al. | 324/312 |
| 4,982,339 | A | * | 1/1991 | Insana et al. | 600/437 |
| 4,991,092 | A | * | 2/1991 | Greensite | 382/131 |
| 5,170,347 | A | * | 12/1992 | Tuy et al. | 345/419 |
| 5,249,264 | A |   | 9/1993 | Matsumoto | 395/134 |
| 5,297,215 | A | * | 3/1994 | Yamagishi | 345/419 |
| 5,432,894 | A | * | 7/1995 | Funaki | 345/419 |
| 5,479,591 | A | * | 12/1995 | Goto | 345/627 |
| 5,734,384 | A | * | 3/1998 | Yanof et al. | 345/424 |
| 5,737,506 | A | * | 4/1998 | McKenna et al. | 345/582 |
| RE35,798 | E | * | 5/1998 | Kimura | 345/424 |
| 5,793,375 | A | * | 8/1998 | Tanaka | 345/424 |
| 5,859,891 | A | * | 1/1999 | Hibbard | 378/62 |
| 5,970,164 | A | * | 10/1999 | Bamberger et al. | 378/37 |
| 6,169,552 | B1 | * | 1/2001 | Endo et al. | 345/419 |
| 6,181,348 | B1 | * | 1/2001 | Geiger | 345/423 |
| 6,195,474 | B1 | * | 2/2001 | Snyder et al. | 382/128 |
| 6,215,893 | B1 | * | 4/2001 | Leshem et al. | 382/128 |
| 6,221,016 | B1 | * | 4/2001 | Hayakawa | 600/443 |
| 6,243,095 | B1 | * | 6/2001 | Shile et al. | 345/854 |
| 6,272,366 | B1 | * | 8/2001 | Vining | 600/407 |
| 6,346,940 | B1 | * | 2/2002 | Fukunaga | 345/427 |
| 6,424,464 | B1 | * | 7/2002 | Neff et al. | 359/451 |
| 6,430,430 | B1 | * | 8/2002 | Gosche | 600/410 |
| 6,456,735 | B1 | * | 9/2002 | Sato et al. | 382/131 |
| 6,545,678 | B1 | * | 4/2003 | Ohazama | 345/427 |

OTHER PUBLICATIONS

Hubbold et al, "Stero Display of Nested 3D Volume Data Using Automatic Tunneling", Proc. of the SPIE, Jan. 1999, pp. 200-207.
Viega J et al, "3D Magic Lenses", ACM Symposium on User Interface Software and Technology, NY, NY; ACM 1996, pp. 51-58.
Lorensen, W.E., Geometric Clippling using Boolean Textures:, IEEE Conf. Visualization, Oct. 25-29, 1993, Procs. Visualization, '93, IEEE Compt. Soc. pp. 268-274.

* cited by examiner

*Primary Examiner*—Ryan Yang
(74) *Attorney, Agent, or Firm*—Cantor Colburn LLP

(57) ABSTRACT

The invention concerns a method of visualization of a part of a three-dimensional image. The part is defined by a finite predetermined volume, a sphere, for example, the center of which is located on an element of interest present in the three-dimensional image. In order to do so, a point is selected on the element of interest, a sphere is created in the three-dimensional image, the dimensions of which are predetermined and the center of which is the point on the element of interest, an intersection is made between the sphere and the three-dimensional image, and then the part of the three-dimensional image contained in the sphere is displayed.

9 Claims, 2 Drawing Sheets

FIG_1
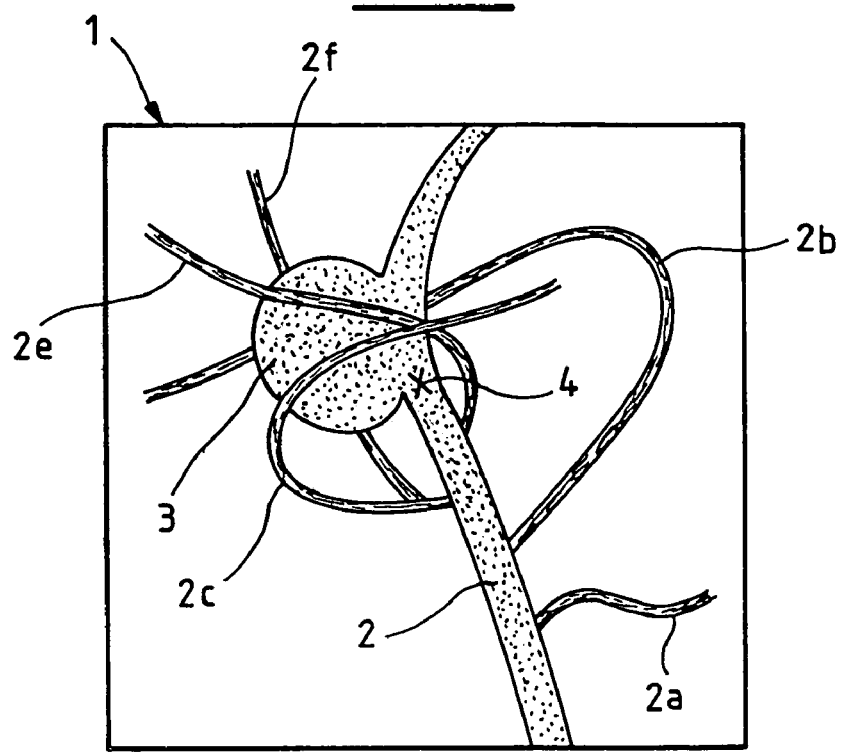
FIG_2
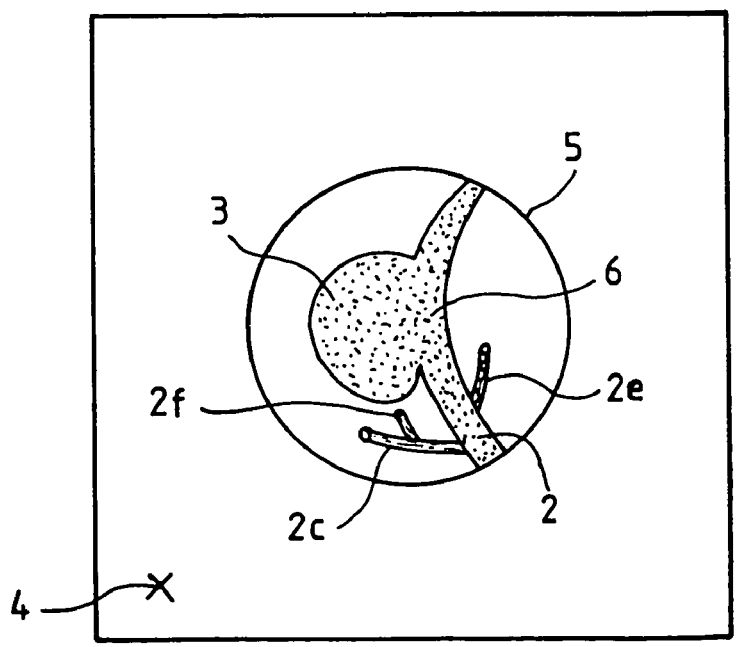

FIG_3
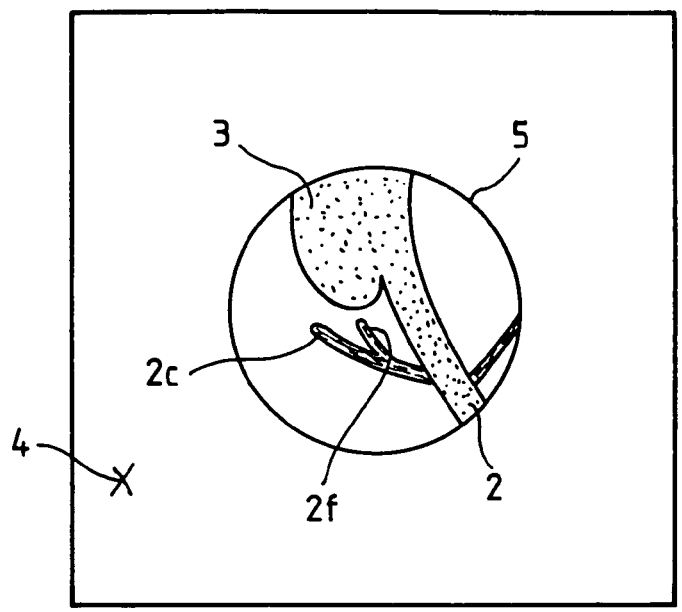
FIG_4
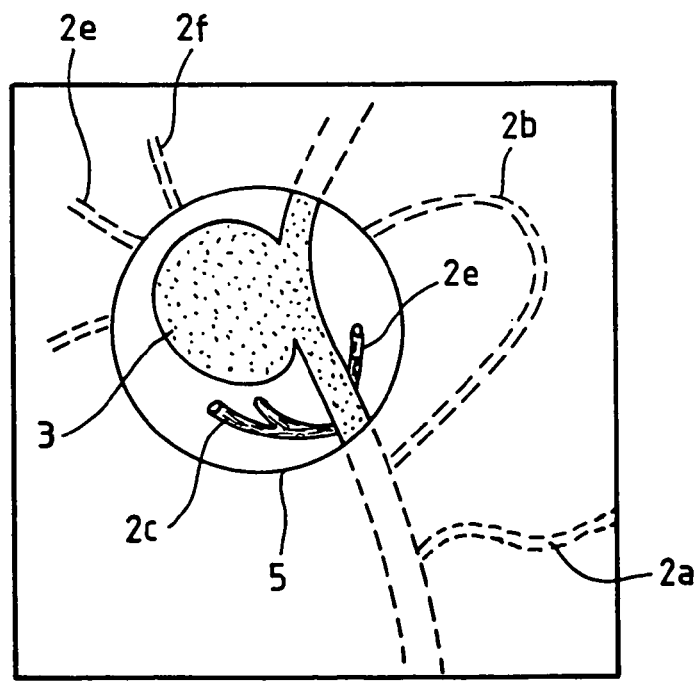

METHOD OF VISUALIZATION OF A PART OF A THREE-DIMENSIONAL IMAGE

CROSS-REFERENCE TO RELATED APPLICATIONS

This application claims the benefit of a priority under 35 USC 119 (a)–(d) to French patent application 99 07854 filed Jun. 21, 1999, the entire contents of which are hereby incorporated by reference.

BACKGROUND OF THE INVENTION

The present invention concerns a method of visualization of a part of a three-dimensional image.

In the medical field, for example, three-dimensional images are frequently used to make diagnoses. In the field of radiology, notably a three-dimensional image can embrace a multitude of interlaced blood vessels. During an examination, a radiologist may want to isolate a part of the image which seems of interest in order to visualize it in detail and establish a diagnosis. A side pocket formed by dilation of an arterial wall, an aneurysm in other words, may be hard to visualize in a three-dimensional image, especially when that pocket is hidden by a multitude of blood vessels. Even several rotations of the three-dimensional image in space do not always make it possible to visualize the aneurysm at a favorable angel. The same is true for the visualization of other pathologies such as stenosis.

There are known methods, described below, making it possible to isolate a part of a three-dimensional image.

It is known how to create zoom effects on an element of interest contained in a three-dimensional image, but the image thus obtained after zooming is not always of very good quality, owing to the fact that for small elements of interest it is necessary to make several enlargements (zoom).

Methods are also known for isolating a part of a three-dimensional image by cut planes. For this purpose, from a given three-dimensional image a cut plane is chosen by tracing a straight line on the three-dimensional image display window by means of a cursor. Thus, the part of the image present, for example, below the line traced is removed from the image. A new three-dimensional image is obtained which is identical to an upper part of the original three-dimensional image.

Finally, the virtual scalpel method is known, making it possible to isolate a part of the three-dimensional image. The isolated part is determined with a free form. The radiologist determines any form by tracing a polygon on the three-dimensional image. The volume taken into account is a cylinder of section identical to the polygon and of infinite length in the direction perpendicular to the display window. A three-dimensional image is then obtained in which only the parts contained in the volume defined by the cylinder are visualized. However, this method has numerous disadvantages, namely:

a lack of interactivity owing to the fact that the parts not visible are no longer accessible, the form obtained cannot be modified and another view necessitates tracing the polygon once again;

failure to control the final volume, since the tracing is done is two dimensions and the lines of the tracing are interpreted in three dimensions according to particular rules;

slowness due to "manual" tracing of the polygon.

BRIEF DESCRIPTION OF THE INVENTION

An embodiment of the present invention is to remedy the disadvantages of the aforesaid methods and to propose a method for rapidly isolating a part of a three-dimensional image and easily and interactively modifying the form of the volume visualized.

The invention therefore proposes a method of visualization of a part of a three-dimensional image. The three-dimensional image is shown on a display screen or on a window of the screen. The visualized part is defined by a finite predetermined volume, the center of which is located on an element of interest present in the three-dimensional image. Being limited to a finite predetermined volume, any element present around the element of interest and outside the predetermined volume is no longer visible. The three-dimensional image obtained appears sharp, for only elements contained in the predetermined volume are visible. Most of the known methods applicable on any three-dimensional image, such as zoom, rotation of the three-dimensional image at different angles, etc., can advantageously be applied.

The three-dimensional image can be contained following a magnetic resonance, a scanner or an X-ray exposure.

The final three-dimensional image is obtained in the predetermined volume by:

a) selecting a point on the element of interest, b) creating in the three-dimensional image a volume whose dimensions are predetermined and whose center is the point on the element of interest, c) making the intersection between the predetermined volume and the three-dimensional image, d) displaying the part of the three-dimensional image contained in the predetermined volume.

In an embodiment, the predetermined volume can be displayed in the three-dimensional image according to a translational motion, while displaying only the part of the three-dimensional image contained at each instant in the predetermined volume. In an embodiment of the invention it is interactive. By displaying (by translation) the predetermined volume in a two-dimensional space, that is, the center of the predetermined volume is displaced along a plane parallel to the display window, all of the elements of the three-dimensional image closed enough to the plane to be visible in the predetermined volume can be scanned. The displacement is obtained by repeating stages b), c) and d) and by taking as new center of the predetermined volume a point situated in the plane (plane parallel to the display window and passing through the first point taken as center of the predetermined volume) and away from the preceding center by a length chosen by the radiologist.

Instead of displacing the predetermined volume, the three-dimensional image is moved keeping the predetermined volume fixed on the display window.

According to preferred embodiment, one displays the part of the three-dimensional image contained in the predetermined volume as well as any other part of the three-dimensional image not contained in a cylinder, with the predetermined volume, of section identical to the section of the predetermined volume and of infinite length, while any part of the three-dimensional image not contained in the cylinder is displayed in degraded mode.

The dimensions of the predetermined volume are advantageously changeable. The operator can choose to reduce or increase the predetermined volume. In order to do so, stages b), c) and d) are carried out, keeping the same center and changing the dimensions of the volume at the operator's choice.

The predetermined volume is preferably a sphere whose initial diameter is equal to half the width of the three-dimensional image display window. A shape other than the sphere can easily be chosen; a parallelpipedon or any other polyhedron whose equation of use is known can, for example, be taken.

According to one method of use of the invention, once the point is selected on the select of interest (stage a), a translation of the three-dimensional image is made, so as to place the point in the center of the three-dimensional display window.

Furthermore, the point can be selected by means of a cursor. The cursor can represent the movement of a mouse manipulated by the radiologist.

BRIEF DESCRIPTION OF THE DRAWINGS

FIG. 1 is a three-dimensional image container a plurality of blood vessels and a hard-to-see aneurysm;

FIG. 2 is a three-dimensional image obtained according to an embodiment of the invention by isolating the aneurysm in particular;

FIG. 3 is a three-dimensional image obtained as a result of a translational motion with the image of FIG. 2; and FIG. 4 is a view of the predetermined volume with a part of the three-dimensional image in degraded mode.

DETAILED DESCRIPTION OF THE INVENTION

Referring to FIG. 1, a display window 1 shows a main blood vessel 2, branching out into a multitude of secondary blood vessels 2a–2f. On an upper part of the main blood vessel, there is an aneurysm 3 that is hard to distinguish, for it is surrounded by secondary blood vessels 2b–2f. When a radiologist wishes to study this aneurysm 3, he can pivot the image, in a manner well known to one skilled in the art, in order to visualize it at different angles. But, as can be seen on the image, the group of secondary blood vessels 2a–2f surrounding the aneurysm 3 prevents good visibility of the latter, whatever the angle of view. In order to be able to pass beyond the secondary vessels 2b–2f and enter a restricted space in which the aneurysm 3 is clearly visible, an embodiment of the invention provides for the isolating of the aneurysm 3 in a given volume.

The aneurysm 3 is selected by clicking above with a mouse manipulated by the radiologist. The mouse is sited on the display window 1 by means of a cursor 4.

Referring not to FIG. 2, an algorithm finds the point selected by the cursor 4 in the three-dimensional space. This point is on the aneurysm 3. The three-dimensional image is moved by translation, so that the point selected by the cursor comes in the center of the display window 1. But it is entirely possible to move that point elsewhere on the display window 1. The center of the window has been chosen for reasons of convenience.

A predetermined volume is then established, which is shown as a sphere 5. The center of the sphere 5 is the point selected by the cursor 4 on the aneurysm 3. The center of the sphere 5 is visualized in the center of the display window 1. The radius of the sphere is chosen as equal to one-quarter the width of the display window 1. An intersection is then made between the sphere 5 and the three-dimensional image and only the parts of the blood vessels contained in the sphere 5 are displayed. The image obtained in the sphere 5 is also a three-dimensional image in which the aneurysm 3 is clearly visible, as is a neck 6 forming the junction between the blood vessel 2 and the aneurysm 3. It is then possible to perform zoom and three-dimensional rotation operations in order to visualize the neck 6 from other views. The radiologist can thus choose the intervention best suited to neutralize the aneurysm 3. The blood vessels 2c, 2e and 2f each contain a part in the sphere 5, while the parts outside the sphere 5 are cut.

It is also possible to vary the dimensions of the sphere by reducing (less elements visible) or enlarging (more elements visible) its radius. In order to do so, on each change of value of the radius of the sphere (entering the new value, for example, by means of a keyboard), from the same center, a new sphere of radius equal to the new value is determined, and then the intersection is made with the three-dimensional image.

It is possible that, starting from the image of FIG. 2, if one clicks, with the mouse button pressed down, on a zone (see cursor 4) outside the sphere 5 and one drags the cursor 4 toward the top of the display window 1, a new image is obtained, according to FIG. 3, in the sphere 5. A part of the main blood vessel 2 is visible here, while it was not in the image of FIG. 2. The new image of FIG. 3 is a new three-dimensional image in which another part of the three-dimensional image of FIG. 1 can be seen, but shifted downward by a distance proportional to the movement of the cursor 4. For that purpose, on each movement of the cursor, upward, for example, a new point is determined on the initial three-dimensional image and then brought back to the center of the display window (the initial three-dimensional image is moved upward) and the intersection is made between the sphere and the three-dimensional image. The movement of the three-dimensional image is a translational motion along the plane of the display window.

As can be seen in FIG. 4, another characteristic of an embodiment of the invention is the possibility of displaying the sphere 5 and a part of the three-dimensional image not contained in the sphere on the same window. The part not contained in the sphere is displayed in degraded mode, for example, with a weaker gray level than the gray level of the image contained in the sphere 5. To visualize the sphere 5 well, the part of the three-dimensional image not contained in the sphere is equivalent to a part of the three-dimensional image that would be determined by placing an empty cylinder, the axis of which is perpendicular to the display window 1 and passes through the center of the display window. Furthermore, the circular section of the cylinder has a diameter equal to the diameter of the sphere 5. Therefore, by visualizing the image of FIG. 4, the initial three-dimensional image is visualized in degraded mode, except for the element contained in the sphere 5, and any element situated in front of and behind the sphere 5 (in relation to the angle of vision of the display window) is erased.

The method disclosed makes it possible to isolate an element of interest in a three-dimensional image. This method enables an operator to save time by comparison with the previous methods. During a neuroradiology intervention, particularly for the embolization of aneurysms, it considerably increases the reliability of such therapeutic procedure.

Various modifications in structure and/or steps and/or function may be made by one skilled in the art without departing from the scope of the invention.

What is claimed is:

1. A method of visualization of a three-dimensional image representative of a three-dimensional imaged object, the method comprising:

displaying the three-dimensional image in a display window;

selecting a point on an element of interest present in a part of the three-dimensional image, and subsequent thereto, moving the three-dimensional image within the display window in response to the selected point on the element of interest;

creating in the part of the three-dimensional image a finite volume whose dimensions are predetermined and whose center is the point on the element of interest present in the part of the three-dimensional image, an outside dimension of the finite volume being less than a width of the display window;

making an interactive intersection between the predetermined finite volume and the part of the three-dimensional image to isolate the element of interest in the three-dimensional image; and displaying in the display window only the part of the three-dimensional image contained in the predetermined finite volume.

2. The method of visualization according to claim 1 wherein the predetermined finite volume can be displaced in the thee-dimensional image. according to a translational motion, while displaying only the part of the three-dimensional image contained at each instant in the predetermined finite volume.

3. The method of visualization according to claim 1 wherein displaying the part of the three-dimensional image contained in the predetermined finite volume as well as any other part of the three-dimensional image not contained in a cylinder, with the predetermined finite volume, of section identical to the section of the predetermined finite volume and of infinite length, and in that any part of the three-dimensional image not contained in the cylinder is displayed in degraded mode.

4. The method of visualization according to claim 1 wherein once a part of the three-dimensional image is visualized in the predetermined finite volume, the dimensions of that predetermined finite volume can be modified by an operator.

5. The method of visualization according to claim 1 wherein the predetermined finite volume is a sphere whose diameter is equal to half the width of a display window of the three-dimensional image.

6. The method of visualization according to claim 1 wherein once the point is selected on the element of interest, a translation of the three-dimensional image is made, so as to place the point in the center of a display window of the three-dimensional image.

7. The method of visualization according to claim 1 wherein the point is selected by means of a cursor.

8. The method of visualization according to claim 1, wherein:

the displaying results in the displaying of white space within the display window and outside of the predetermined finite volume.

9. The method of visualization according to claim 1, wherein:

the making an interactive intersection to isolate the element of interest comprises removing from the image to be displayed those elements outside of the predetermined finite volume.

* * * * *